Figure 1:
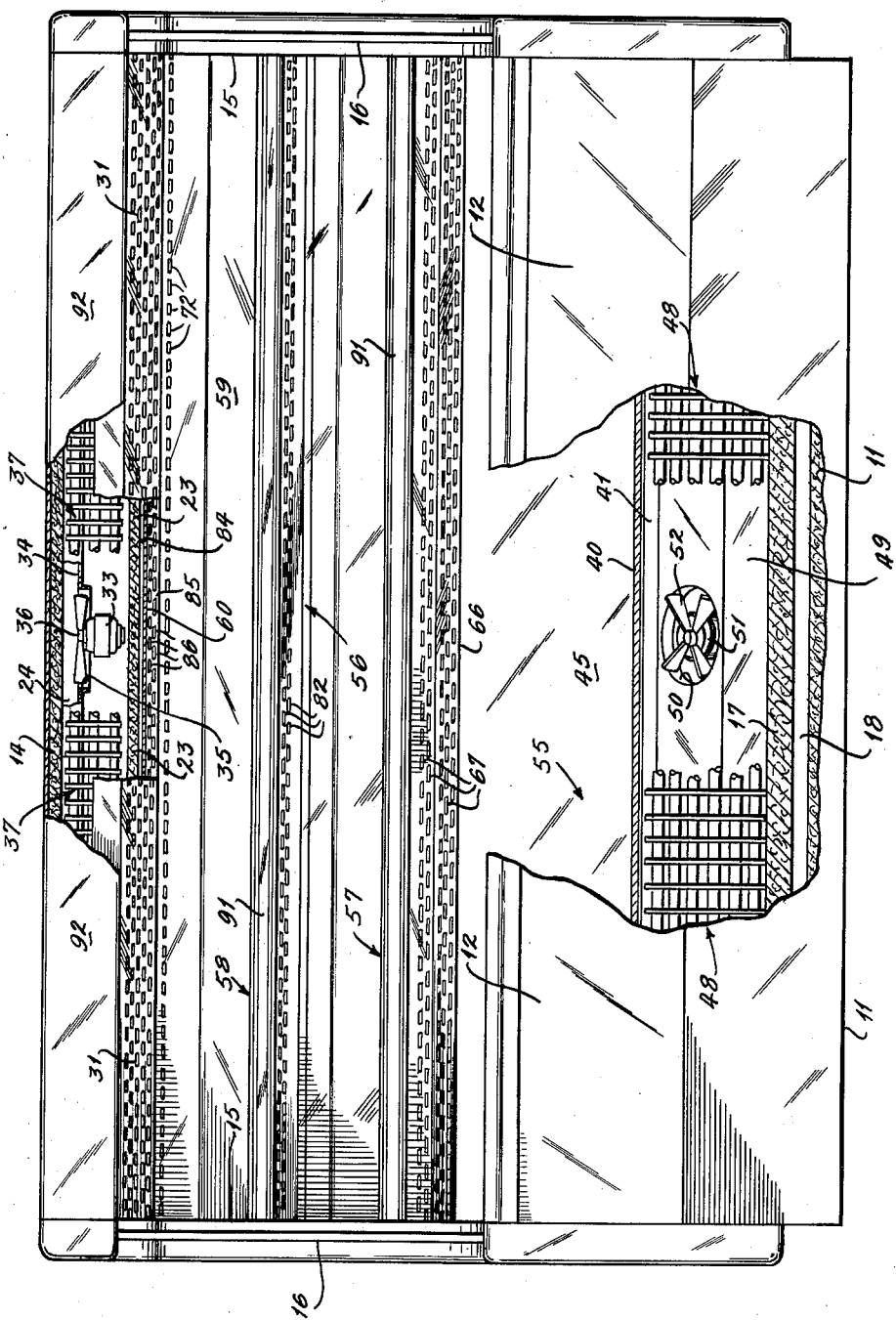

Nov. 13, 1962   E. V. DICKSON ET AL   3,063,254
FOOD MERCHANDISER
Original Filed Feb. 10, 1958   2 Sheets-Sheet 1

INVENTORS:
EDGAR V. DICKSON
THEODORE E. WEBER
By Gravely, Lieder & Woodruff
ATTORNEYS.

United States Patent Office 3,063,254
Patented Nov. 13, 1962

3,063,254
FOOD MERCHANDISER
Edgar V. Dickson, Ladue, and Theodore E. Weber, Affton, Mo., assignors to Hussmann Refrigerator Co., St. Louis, Mo., a corporation of Delaware
Continuation of application Ser. No. 714,374, Feb. 10, 1958. This application Nov. 9, 1960, Ser. No. 68,308
24 Claims. (Cl. 62—256)

This invention relates generally to the refrigeration art, and more particularly to a novel food merchandiser especially adapted for low temperature refrigeration of frozen food products.

In the past many food merchandisers have been provided for products requiring higher temperature refrigeration, such as dairy products or the like, and for products requiring low temperature refrigeration such as frozen food products. For purposes of disclosure "high temperature refrigeration" will refer to cooling temperatures above the freezing point of water and particularly about 38° Fahrenheit, and "low temperature refrigeration" will refer to temperatures below the freezing point of water and generally around 0° Fahrenheit. In our co-pending application, now U.S. Patent No. 2,822,672, for Display Case with Adjustable Refrigerated Shelves, a food mechandiser overcoming many prior art deficiencies with regard to air flow control for an open front display area is disclosed in association with high temperature refrigeration equipment. However, none of the food merchandisers for low temperature refrigeration have been entirely satisfactory.

In particular, heretofore it has not been practical to display frozen merchandise on vertically-spaced accessible shelves so that this merchandise was easily seen and reached by the consumer without also providing doors or glass barriers at the front edges of the shelves to maintain the temperatures of the merchandiser below freezing. As a result, the low temperature refrigeration equipment, particularly for self-service markets, has generally been limited to refrigerated cases having deep wells in which food products were stacked, and the tops of such cases are most frequently provided with sliding covers. Manifestly, deep well type cases are not completely acceptable to consumers who must reach over and into the well to obtain products and frequently must hunt for the kind of product desired as these cannot be easily seen. Deep well type cases also require a large amount of floor space and require frequent defrosting and attention.

The principal object of the present invention is to provide a food merchandiser having a plurality of shelves for displaying frozen food products, the merchandiser being efficient in operation for maintaining the display area thereof below freezing temperatures.

Another object is to provide an open front food merchandiser having a plurality of vertically spaced shelves on which frozen food products may be arranged for optimum access and sight as well as utilization of space.

Still another object is to provide a food merchandiser for maintaining low temperatures in a relatively large display area, for minimizing intermixture of room temperature air and refrigerated air and for providing recirculation of the refrigerated air to obtain optimum cooling and efficiency of the merchandiser.

A still further object is to provide an improved food merchandiser maintaining freezing temperatures in the display area in which a plurality of shelves are adjustably positioned and substantially evenly cooled.

Another object is to provide an efficient and simple food merchandiser using a minimum of floor space and providing a large display area for displaying frozen foods that can be seen and reached without bending over, and having no doors or other closing means preventing easy accessibility to the display area.

It is also an object to provide an open front frozen food merchandiser having controlled forced air circulation substantially eliminating condensation within the display area thereof. It is a further object to substantially reduce condensation on evaporator coils of a low temperature refrigeration system of the merchandiser.

These and still other objects and advantages will become apparent hereinafter.

Briefly, the invention comprises a food merchandiser having a display area with an open front, first air circulating and cooling means for passing low temperature refrigerated air through the display area, and second air circulating and cooling means for establishing a refrigerated air wall in front of the low temperature air circulated by the first means and for reducing intermixture of ambient warmer air with the refrigerated air currents.

Figure 2:
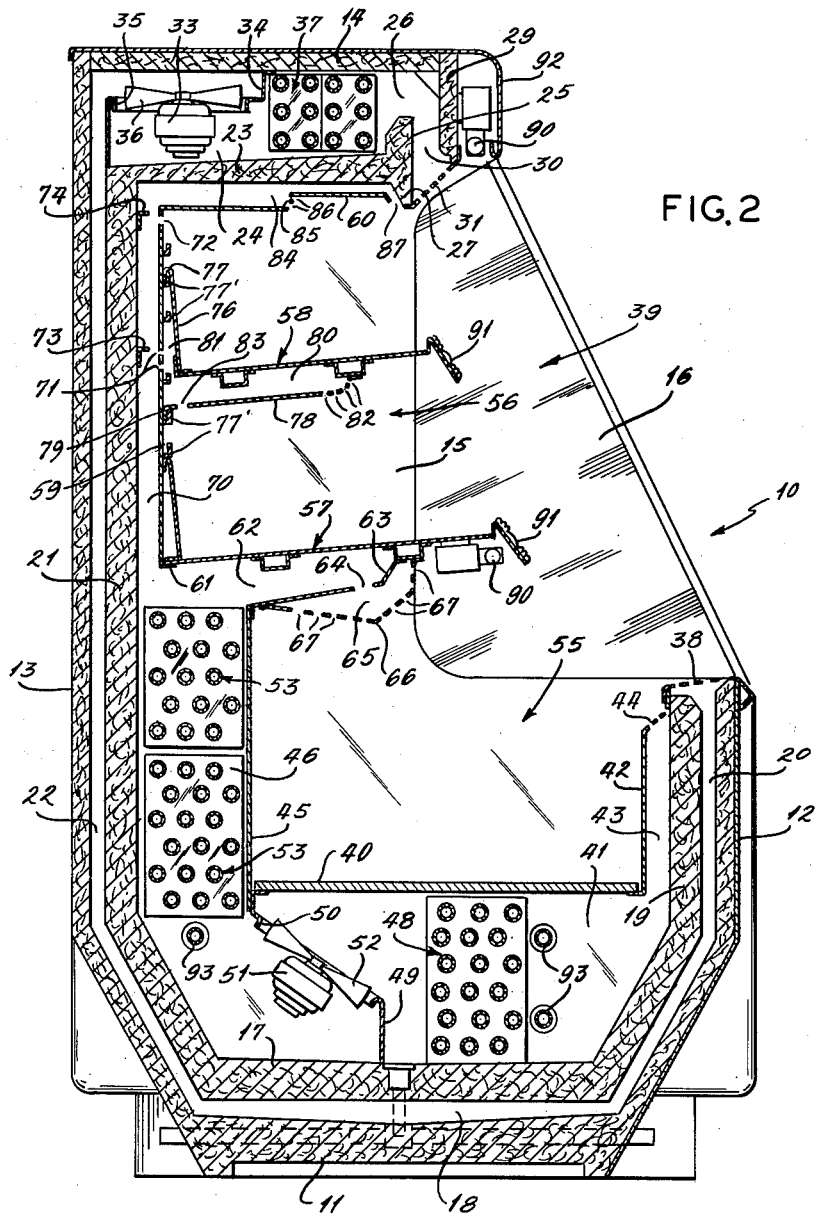

The invention also consists in the parts and in the arrangements and combinations of parts hereinafter described and claimed. In the accompanying drawing which forms a part of this specification and wherein like numerals refer to like parts wherever they occur:

FIG. 1 is a front elevational view, partly broken away, of a food merchandiser embodying the present invention, and FIG. 2 is a vertical transverse sectional view taken substantially through the center of FIG. 1.

This is a continuation of co-pending application Serial No. 714,374, filed February 10, 1958, for Food Merchandiser, now abandoned.

Referring now to the drawings, a food merchandiser 10 embodying the present invention includes an insulated outer cabinet having a base 11, a low front wall 12, a high rear wall 13, a top wall 14 extending forwardly from the rear wall 13 and end walls 15. Each end wall 15 has a forwardly extending transparent panel 16, and the front of the frozen food merchandiser 10 is open between the front wall 12 and top wall 14 for direct accessibility to the interior of the merchandiser.

Positioned within the outer cabinet and extending longitudinally between the end walls 15 thereof is an intermediate insulated cabinet which includes a bottom wall 17 in spaced relation with the base 11 to provide a bottom flue 18, a front wall 19 spaced from the low front wall 12 to provide a front flue or return duct 20 in communication with the bottom flue 18, a rear wall 21 spaced from the back or rear wall 13 to provide a rear flue 22 also in communication with the bottom flue 18, and a short top wall 23 spaced below the top wall 14 and defining a refrigeration chamber 24 therebetween. In FIG. 2 is will be seen that the wall 23 slopes downwardly toward the rear wall 13 for a purpose to be set out hereinafter. The forward end of the top wall 23 has an upwardly projecting member 25 extending toward the top wall 14 for forming a restricted opening 26 therebetween, and a lower member 27 extends downwardly from the top wall 23. The top wall 14 of the outer cabinet has a short vertical front wall 29 extending downwardly therefrom in spaced relation with the top wall 23 and members 25 and 27 to form a discharge chamber 30 therebetween, a perforated plate 31 being provided between the wall 14 and the lower member 27 through which refrigerated air is discharged, as will also be more fully set out hereinafter. The plate 31 is angularly positioned in a plane substantially perpendicular to the path of air flow desired.

The refrigeration chamber 24 houses a fan 33 or similar air circulating means and the chamber 24 is divided by a partition 34 extending between the rear wall 21 and the top wall 14, the partition having an opening 35 in which the fan blade 36 is mounted for efficiently moving air through the refrigeration chamber to the discharge plate 31 and across the open front of the merchandiser to the return duct 20. The chamber 24 preferably houses an evaporator coil 37 or like cooling means of a closed refrigeration system (not shown), the evaporator coil 37 being shown positioned forwardly of the fan 33 and extending longitudinally of the merchandiser 10 for cooling the air forming a wall across the open front thereof.

The return duct 20, bottom and rear flues 18 and 22, refrigeration chamber 24 and discharge member 30 form an air cooling and circulatory system for continuously recirculating refrigerated air. This refrigeration system will hereinafter be referred to as a "secondary" system inasmuch as the wall of air merely defines the front of the merchandiser 10 and does not directly cool food products therein. The coil 37 is adapted to cool air at least to the higher refrigeration temperatures, and the fan 33 is adapted to create a negative pressure through the rear, bottom and front flues to draw previously cooled air into the front flue 30 and to force refrigerated air of the secondary system out of the discharge chamber 30 and across the merchandiser 10. As previously stated, this secondary air forms a refrigerated air wall extending between the perforated plate 31 at the discharge and a perforated plate 38 covering the return duct 20.

The food merchandiser 10 also includes an inner cabinet defining a display area 39 in which frozen food products are positioned for refrigeration. The inner cabinet also extends longitudinally between the end walls 15 of the outer cabinet and includes a bottom plate or wall 40 spaced above the bottom wall 17 of the intermediate cabinet to form a refrigeration chamber 41 for a primary refrigeration system. A front panel 42 is spaced from the front wall 19 of the intermediate cabinet and provides a cold air return flue or duct 43 therebetween, the panel 42 having an angularly-positioned perforated end portion 44 secured to the front wall 19. The end member 44 forms a return or inlet for the front flue 43. The inner cabinet also includes a lower rear panel 45 spaced forwardly from the rear wall 21 of the intermediate cabinet and defining an auxiliary refrigeration chamber 46 therebetween.

The return flue 43 is in communication with the refrigeration chamber 41, which houses an evaporator coil 48 extending longitudinally of the merchandiser 10. The refrigeration chamber 41 is divided by a partition 49 having an opening 50 therein, and a fan 51 or like air circulating means is mounted in the chamber with its blade 52 positioned in the opening. The auxiliary chamber 46 is in communication with the refrigeration chamber 41 through the fan blade opening 50, and the auxiliary chamber houses auxiliary cooling coils 53 through which air is forced by the fan 51. The coils 48 and 53 may be part of a single closed refrigeration system (not shown) and, as shown in FIG. 2, the coils 48 and 53 are positioned on opposite sides of the fan 51.

Still referring to FIG. 2, it is clearly shown that the chambers 41 and 46 together form an L-shaped main refrigeration chamber positioned at the bottom and rear of the display case 10 and having inlet and outlet ends in communication with the air return flue 43 and air delivery ducts 62 and 70, respectively. Inasmuch as the coils 48 and 53 may be connected in a single closed refrigeration system, the first evaporator section 48 adjacent to the inlet end and second evaporator section 53 adjacent to the outlet end will be provided with a common refrigerant coil arranged to provide the second evaporator section 53 with lower temperatures relative to the temperatures of the first evaporator section 48 in order that the air temperature is further lowered as the air passes through the second section 53 as set out hereinafter. It will be noted that the partition 49 forms a supporting plate for mounting the fan or blower 51 in the opening 50, and that the partition extends from the plate 40 to the wall 17 so that all of the air circulated in the chamber is drawn through the first evaporator section 48 by the fan and discharged through the second evaporator section 53. The fan blade 52 is shown in an angular position, more nearly horizontal than vertical, for directing air in a downward path toward the wall 17 and producing a more uniform dispersion of air through evaporator 53 than when the fan is in a more vertical position.

It is now apparent that air is drawn into the return flue 43 by the negative pressure developed by the fan 51 and passed through the coils 48, and is then forced upwardly through the auxiliary coils 53 whereby the air is refrigerated to the low temperatures required for maintaining food products in frozen condition. This refrigeration system is a portion of a "primary" system for providing low temperature refrigerated air directly to food products in the display area.

The bottom plate 40 and front and rear panels 42 and 45 of the inner cabinet and the end wall 15 of the outer cabinet define a lower portion or well 55 of the display area 39 in which food products may be positioned in a conventional manner. The display area 39 also includes an upper portion 56 which may be provided with lower and upper shelves 57 and 58, respectively. The upper portion 56 also extends between the end walls 15 of the outer cabinet and is delimited at the rear by an upper rear panel 59 and at the top by a top panel 60.

The lower end 61 of the upper rear panel 59 is preferably spaced above the upper end of the lower rear panel 45, and the lower shelf 57 may be secured to the lower end 61 of the panel 59 and extend forwardly therefrom. A forwardly extending chamber 62 is provided below the lower shelf 57, the chamber 62 having a bottom and front forming wall 63 secured to the lower surface of the shelf 57 and to the upper end of the lower rear panel 45. The chamber 62 is in communication with the auxiliary refrigeration chamber 46 and the chamber wall 63 has an aperture 64 through which refrigerated air from the auxiliary coils 53 is expelled into an outlet chamber 65 defined by a plate 66 having perforations 67. The refrigerated air passes through the perforated plate 66 from the chamber 65 and is drawn across the top of the well 55 toward the return inlet plate 44 of the front flue 43 of the primary refrigeration system. Mainfestly, the low temperature air will tend to fall into the well whereby food products therein are kept at low temperatures. However, the velocity at which air is expelled through the perforated plate 66 provides a forwardly moving air current to be formed against the lower surface of the shelf 57 to the front edge thereof.

The upper rear panel 59 is spaced from the rear wall 21 of the intermediate cabinet by suitable means (not shown) to provide a rear cold air delivery flue or duct 70 therebetween, the duct 70 being in communication with the auxiliary refrigeration chamber 46 and the chamber 62 and receiving a stream of low temperature air from the former. As shown in FIG. 2, the rear panel 59 is offset relative to the vertical plane of the panel 45 so that the rear duct 70 is directly in communication with a portion of the chamber 46, the rearward portion of the lower shelf 57 overhanging the refrigeration chamber 46 and acting as a baffle for deflecting a portion of the air stream from the chamber 46 into the chamber 62.

The upper rear panel 59 is provided with lower air outlet openings 71 and with upper air outlet openings 72, and lower and upper baffles 73 and 74 are positioned in the rear duct 70 and secured to the wall 21 for deflecting a portion of the primary air stream through the openings 71 and 72.

The upper shelf 58 is adjustably mounted on the rear panel 59 and extends forwardly therefrom into the upper portion 56 of the display area 39. In FIG. 2 it will be seen that each shelf 57 and 58 is angularly positioned relative to horizontal and has a back plate 76 secured at substantially right angles thereto so that the plates 76 are angularly positioned relative to the rear panel 59. This shelf means is especially adapted to receive frozen food packages thereon and prevents them from falling off the front edge of the shelf. The upper edge 77 of the plate 76 of the upper shelf 58 is adapted to be removably and adjustably interlocked with the upper rear panel 59 in any suitable manner, such as by locking means 77'. A channel defining member or wall 78 is secured to the lower surface of the shelf 58 adjacent to the front edge thereof and extends rearwardly, the rearward edge 79 of the wall 78 being provided with locking means 77' for removably interlocking the wall with the rear panel 59. Accordingly, the shelf 58 is supported on the rear panel 59 and may be adjusted thereon. The wall 78 is spaced below the shelf 58 and defines a forwardly extending chamber 80 in communication with a vertically extending chamber 81 between the angular plate 76 and the rear panel 59, and the lower openings 71 are formed in the panel in position to provide communication from the rear duct 70 to these chambers 80 and 81 regardless of the vertical adjustment of the upper shelf 58. The chamber wall 78 has perforations 82 at its forward end through which refrigerated air of the primary stream is discharged in a forwardly moving path toward the front of the shelf 58 and adjacent to the lower surface thereof. This stream of air then flows downwardly across the front of the lower shelf 57 toward the cold air return or inlet 44. The chamber wall 78 also has perforations 83 adjacent to the rearward edge 79 through which low temperature refrigerated air is discharged onto the lower shelf 57 for maintaining food products thereon in frozen condition.

The top panel 60 delimiting the top of the display area 39 is spaced below the top wall 23 of the intermediate cabinet and provides a forwardly extending discharge flue or duct 84. The top panel 60 is secured to the rear panel 59 above the openings 72 through which a portion of air is deflected by baffle 74, but most of the air is pushed forwardly into the duct 84. The top panel 60 is stepped longitudinally intermediate its front and rear edges to provide a vertical wall 85 which has apertures 86 through which a portion of the remaining air stream is expelled into the display area 39. The forward edge of the panel 60 is spaced away from the lower member 27 of the intermediate cabinet and defines an angularly positioned discharge flue 87 therebetween through which the remaining portion of the primary low temperature air stream is discharged.

In the operation of the merchandiser 10, the primary system and the secondary system cooperate to provide low temperatures in the display area 39 for keeping food products in frozen condition and for providing a cold front or wall of refrigerated air obviating the necessity for doors or glass panels across the front of the merchandiser shelves or a glass retaining wall or barrier extending above the low front wall 12 of the outer cabinet. The two systems also reduce to a minimum the amount of ambient room temperature air that becomes intermixed with the refrigerated front wall of air so that the merchandiser can operate efficiently and perform its function of providing low temperatures for frozen food products. In addition, moisture is substantially eliminated from the display area 39 so that condensation on the walls of the merchandiser 10 and the food products is minimized; and condensation, and consequent frosting, is substantially reduced on the evaporator coils 48 and 53 of the primary system.

In the operation of the primary system, the fan 51 draws cold air into the return duct 43 from the display area 39 and past the refrigeration coil 48, and pushes this refrigerated air through the coils 53 in the auxiliary chamber 46 where the temperature of the air is dropped to the required degree of coldness. The primary air stream forced through the coils 53 is divided and a portion of the air passed into the rear delivery duct 70 and another portion of the air is deflected forwardly in the chamber 62, through the opening 64 into the discharge chamber 65 and forwardly and downwardly through the perforations 67 toward the return duct 43. Thus, the lower portion 55 of the display area is cooled and the forward direction of the air discharged from the chamber 65 assists in supporting the front wall of air of the secondary system.

The portion of air forced upwardly into the rear duct 70 is further divided by the baffles 73 and 74 into three streams, the lower stream passing through openings 71 into chambers 80 and 81 under the upper shelf 58 and outwardly through perforations 82 and 83 for cooling the lower shelf 57 and assisting in supporting the front wall of air to prevent turbulence and intermixture of ambient air therewith. The second stream of air from the rear duct 70 is discharged through upper openings 72 into the display area above the upper shelf 58, and the remaining or uppermost stream of air is deflected by baffle 74 into the forwardly extending top duct 84. The latter stream is further divided, a portion thereof passing through apertures 86 in a forwardly directed path along the top panel 60 toward the discharge flue 87, and the remainder of the low temperature primary air stream being discharged through the angularly positioned discharge flue 87 and forming a wall of low temperature air in front of the shelves 57 and 58. The air passing in front of the shelves is directed downwardly toward the return duct 43 in the front wall of the merchandiser 10 and is returned to the primary system for further refrigeration and recirculation.

The forward flow of air beneath each shelf 57 and 58 and the top wall 23 has a velocity that will cause the air to move substantially parallel to the shelves and top wall until these air streams merge with the downwardly moving primary air wall. Inasmuch as low temperature air will naturally tend to fall, the forwardly moving path of air is provided beneath each shelf to prevent the front wall of air from being drawn inwardly or rearwardly at these areas thereby causing a turbulence that would cause intermixture of ambient air with the cold front wall of the merchandiser 10.

In the operation of the secondary system, refrigerated air is drawn into the front flue 20, across the bottom flue 18 and upwardly in the rear flue 22 to the refrigeration chamber 24. This air is pushed by the fan 33 through the coil 37 and outwardly and downwardly through the discharge chamber 30. The air of the secondary system is expelled through the perforated plate 31 in a direction toward the cold air return flue 38 and forms a wall or stratum of air in front of the wall of low temperature air moving downwardly between the discharge opening 87 in the top panel 60 and the return duct 43.

The wall of secondary air across the front of the merchandiser 10 has a temperature higher than the low temperature air wall discharged through the flue 87, preferably in the range of higher refrigeration temperatures. The secondary air wall moves more slowly across the front of the merchandiser than the low temperature or primary wall, but in a direction substantially parallel therewith. Accordingly, intermixture between the two walls of air is minimized, and the intermixture of ambient room temperature air with the secondary air wall and aspiration of room air into the display area is also minimized. The secondary air wall will also prevent substantial amounts of moisture from passing into the primary air wall by reason of its higher temperature, and moisture in the secondary system is condensed by the coil 37 and drained off whereby the secondary air wall is relatively dry.

The present merchandiser is efficient in operation and provides a much larger, more accessible shelf space or display area for displaying frozen food products than has been known heretofore and, in addition, the upper surface of the top wall 14 of the merchandiser may be used as an unrefrigerated shelf or storage space. The merchandiser 10 is provided with lamps 90 for lighting the display area 39, and price tag mouldings 91 or the like may be provided on the front edge of the shelves 57 and 58 for identifying goods or the cost thereof. It is also within the scope of the present invention to provide additional shelves, if desired, and to make all of the shelves adjustable vertically in the display area. A decorative display panel 92 is provided in front of the vertical wall 29 at the top wall 14, and one of the lamps 90 may be positioned behind this panel. In addition, the evaporator coils 48 and 53 of the low temperature system are provided with conventional heating elements 93 for periodic defrosting of the coils whereby the efficient operation of the merchandiser 10 is assured. The evaporator coil 37 may be eliminated under certain operating conditions or the secondary air stream may be cooled to higher refrigeration temperatures by conduction from the primary system.

It is to be understood that the foregoing description and accompanying drawing have been given only by way of illustration and example, and that changes and modifications in the present disclosure, which will be readily apparent to all skilled in the art, are contemplated as within the scope of the present invention, which is limited only by the claims which follow.

We claim:

1. An open front merchandiser having a display area including a lower well portion and an upper shelf portion, and at least one shelf positioned in the upper shelf portion of the display area, said merchandiser comprising a primary system including means for cooling air to low refrigeration temperatures, means for circulating low temperature air through the lower and upper portions of the display area, said last mentioned means including ducts having air outlets beneath the shelf adjacent to the front edge thereof and adjacent to the front of the merchandiser at the top thereof, and a secondary system for cooling and circulating high temperature refrigerated air in a wall across the open front of the merchandiser in front of the well and shelf, said air outlets of said primary system being formed to discharge low temperature refrigerated air from said ducts in a direction toward said wall of high temperature refrigerated air.

2. An open front merchandiser including a well and a shelf vertically spaced above the well; said merchandiser comprising a primary air cooling and circulating system having a refrigeration chamber for cooling air to low refrigeration temperatures, a delivery duct in communication with the refrigeration chamber, first air discharge means from the delivery duct above said well beneath said shelf adjacent to the forward edge thereof, second air discharge means above said shelf and a return duct in front of said well in communication with said refrigeration chamber; and a secondary air cooling and circulating system having an air discharge at the front of the merchandiser above said shelf and an air return in front of said return duct of said primary system, and flue means in the merchandiser providing an air passage between the air discharge and air return, said secondary system forming an air wall between said air discharge and return therefor, and said primary system discharging low refrigeration temperature air in a forward direction through said discharge means to support said air wall of said secondary system in a substantially non-turbulent path between the air discharge and return therefor.

3. An open front merchandiser for frozen food having a display area including a lower well portion and an upper shelf portion with vertically spaced shelves therein, said merchandiser comprising a primary air cooling and circulating system for discharging low temperature refrigerated air into said display area for cooling the well portion and shelf portion thereof including first and second air outlets beneath the shelves adjacent to the front edges thereof and a third air outlet at the top of the merchandiser adjacent to the open front thereof, a secondary air cooling and circulating system forming a high refrigeration temperature curtain across said open front and including an outlet at the top the merchandiser in front of and immediately adjacent to the third outlet for low temperature refrigerated air, said primary and secondary systems having air return openings in front of the lower well portion of the display area at the bottom of the open front of the merchandiser for receiving cooled air for re-cooling and recirculation by said systems.

4. An open front merchandiser for frozen food products comprising an outer cabinet having a base, rear wall, end walls, top wall and a low front wall; an inner cabinet within the outer cabinet defining a display area having a lower well portion and an upper portion, said inner cabinet extending between the end walls and including a bottom panel, rear panel, top panel and low front panel; a primary air cooling and circulating system including a refrigeration chamber between said inner and outer cabinets, air cooling means in said refrigeration chamber for cooling air to low refrigeration temperatures, air circulating means for moving low temperature refrigerated air in said primary system, a return air duct between said front panel and front wall in communication with said refrigeration chamber, air discharge means from said refrigeration chamber including first outlet means through which low temperature refrigerated air is discharged into said display area, and second outlet means through which low temperature refrigerated air is discharged adjacent to the front of the merchandiser at the top panel to form an air wall across the open front of the merchandiser; and a secondary system forming an air wall of high temperature refrigerated air in front of the low temperature refrigerated air wall and supported thereby.

5. The merchandiser according to claim 4 wherein said primary system air cooling means comprises at least two evaporator coils positioned on opposite sides of said air circulating means, and heat applying means for periodically raising the temperature of said coils to remove frost and ice formations therefrom.

6. The merchandiser according to claim 4 wherein vertically spaced shelves are provided in said upper portion of said display area, and said first outlet means includes openings below each of said shelves through which low temperature air is expelled in a path substantially parallel to said shelves and extending to adjacent the front edges thereof.

7. An open front merchandiser for frozen food products comprising an outer cabinet having a base, a rear wall, end walls, a top wall and a relatively low front wall; a second cabinet positioned within the outer cabinet and extending longitudinally between the end walls thereof, said second cabinet including a front wall spaced from the front wall of the outer cabinet to provide a return flue, a bottom wall spaced above said base to provide a bottom flue in communication with said front flue, a rear wall spaced from said rear wall of the outer cabinet to provide a rear flue in communication with said bottom flue, a top wall spaced below said top wall of the outer cabinet to define a first refrigeration chamber in communication with the rear flue and a discharge opening from said first refrigeration chamber adjacent to the front of said top wall of said outer cabinet; first air cooling and circulating means in said first refrigeration chamber for providing a wall of refrigerated air moving downwardly and forwardly across the open front of the merchandiser between said discharge opening and the return flue; an inner cabinet positioned within said second cabinet defining a display area having a lower well portion and an upper shelf portion, said inner cabinet including a front panel spaced from the front wall of said second cabinet to provide a return duct, a bottom panel spaced above the bottom wall to define a second refrigeration chamber in communication with the return duct, a lower rear panel spaced from the rear wall of said second cabinet to define a third refrigeration chamber in communication with the second refrigeration chamber, an upper rear panel spaced from the rear wall of said second cabinet to provide a delivery duct in communication with said third refrigeration chamber, and a top panel spaced below the top wall of said second cabinet to provide a forwardly extending discharge chamber in communication with said delivery duct and having an outlet as its front edge immediately adjacent to the discharge opening from said first refrigeration chamber, said discharge chamber also having a second outlet intermediate the delivery duct and the outlet at the front edge; shelf means in the upper portion of the display area; discharge means above said shelf means, other discharge means below said shelf means adjacent to the front edge thereof; second air cooling and circulating means in said second and third refrigeration chambers for cooling air to low temperatures and for circulating the low temperature air through the display area between the discharge openings and means and the return duct.

8. An open front merchandiser for frozen food products including a vertical display area having a shelf directly accessible through the front opening, means forming an air curtain having a high refrigeration temperature across the front opening in front of the display area, and means distributing low temperature air through said display area, said last mentioned means including a flue beneath said shelf having an opening through which low temperature air is discharged toward said air curtain in a path substantially parallel with said shelf.

9. In an open front merchandiser having a display area for frozen food products, means for producing low refrigeration temperatures in said display area, means forming a downwardly moving air curtain across the open front including a passage having an opening through which air is discharged to form said air curtain, and air cooling means in said passage adjacent to the discharge opening thereof for dehumidifying air to form said air curtain.

10. In an open front merchandiser having a display area for frozen food, said display area being defined by a rear panel, a top panel, end walls, a bottom, a low front panel and means forming an air curtain across the open front of the merchandiser between the top and front panels, means for distributing air for cooling said display area to a low refrigeration temperature, and a shelf mounted for vertical adjustment on the rear panel, said shelf having a back plate adapted to interlock with said rear panel, and a forwardly extending chamber formed under said shelf and having an opening through which low temperature air is discharged adjacent to the front of the display area, said rear panel having a perforation therein providing communication between said chamber and a low temperature air distribution source, and said back plate being angularly positioned relative to said rear panel to define a portion of said chamber and permitting vertical adjustment of said shelf while maintaining communication with said perforation.

11. In a food merchandiser, a display area defined in part by a rear panel, air cooling and circulating means for cooling said display area, a shelf vertically adjustable on said rear panel and containing an air chamber forming a portion of said air circulating means, perforations in said rear panel in communication with said air chamber, and means on said shelf extending angularly relative to said rear panel forming a vertical chamber through which said shelf chamber is in communication with said perforations, said means on said shelf adjustably mounting the shelf on the rear panel.

12. In an open front merchandiser having a display area for frozen products, first means for producing low refrigeration temperatures in said display area, second means forming a high refrigeration temperature air wall across the open front of the merchandiser, said second means including a coil for cooling air forming said air wall to high refrigeration temperatures and for removing moisture from said high refrigeration temperature air, said first means including an air duct having a discharge opening in opposed relation with the air wall and through which low refrigeration temperature air is moved to support and maintain said air wall in a predetermined substantially non-turbulent path across said open front.

13. An open front merchandiser for frozen products comprising a vertical display area accessible through the front opening, at least one shelf in said display area having a substantially unrestricted front edge for direct accessibility and visibility of products on said shelf, means for cooling said display area to low refrigeration temperatures, and means forming an air wall at higher refrigeration temperatures relative to the temperatures of said display area, said air wall extending across said front opening and substantially excluding moisure from said display area, said means for cooling said display area comprising air distributing means including a rear panel in said merchandiser defining a common wall between said display area and an air delivery duct and having an opening therein, means adjustably mounting said shelf on said rear panel and forming a vertical chamber in communication with said air delivery duct through said opening in all positions of shelf adjustment, and an air chamber below said shelf in communication with said vertical chamber and having outlet openings for discharging air into said display area.

14. A refrigerated display case comprising a display area having a shelf therein and a vertical opening in front of the shelf, first means for cooling the display area above and below the shelf to low refrigeration temperatures and forming a wall of low refrigeration temperature air across the vertical opening in front of the shelf, second means forming a wall of high refrigeration temperature air across the vertical opening in front of the shelf outwardly of said low refrigeration temperature air wall from said display area, and means forming low refrigeration temperature air jets above and below said shelf for maintaining a substantially non-turbulent condition of said air walls.

15. A refrigerated display case comprising a display area having a vertical front opening, cooling means for refrigerating air to low temperatures including a refrigeration chamber housing first and second evaporators positioned in series air flow relation, air moving means intermediate said evaporators and positioned in said chamber to move air in an angular direction relative to the direction of air flow through said first and second evaporators, a distribution system for distributing low refrigeration temperature air from the second evaporator in said chamber to said display area and recycling return air from said display area to said first evaporator in said chamber, and a separate air system for forming a wall of high refrigeration temperature air across the front opening of said display area.

16. A refrigerated display case comprising a display area having a vertical front opening, first cooling means for refrigerating air to low refrigeration temperatures including a refrigeration chamber housing first and second evaporators positioned in series air flow relation, air moving means intermediate said evaporators and angularly positioned relative to the direction of air flow through both of said evaporators, a first air system for distributing low refrigeration temperature air from the second evaporator in said chamber to said display area and recycling return air from said display area to said first evaporator in said chamber, a second air system including second air moving means forming a downwardly flowing wall of high refrigeration temperature air across the front opening of said display area and recycling said high refrigeration air in a closed path to the air discharge from which said air wall is formed, and a high refrigeration temperature evaporator in the closed path of said second system for dehumidifying said air forming said air wall, said second air moving means and said high refrigeration temperature evaporator being positioned adjacent to the air discharge.

17. In a refrigerated case of the type described having a display area with an open side for access to products in the display area, an air system for distributing low refrigeration temperature air in the display area including a distribution duct having an opening to the display area and a return duct to receive air from the display area, and air cooling and circulating means for low temperature operation comprising a refrigeration chamber having opposed wall portions and an inlet end connected to said return duct and an outlet end connected to said distribution duct, air moving means mounted in said chamber on a partition plate extending between opposed wall portions, a first evaporator between said air moving means and said inlet end, a second evaporator between said air moving means and said outlet end, said air moving means being positioned in said chamber at an angle to the normal air flow path through said chamber to draw air through said inlet end and substantially evenly across said first evaporator and to move said air in a direction against a wall portion to diffuse and deflect the air before said air is delivered to said second evaporator and through said outlet end to said distribution duct, and other air distribution means for forming a wall of air across the open side of said display area.

18. In a refrigerated case of the type described having a display area accessible through an open side thereof, and air distribution means including a return duct for recycling air from the display area and a delivery duct for distributing recycled air to the display area; low temperature air cooling and circulating means comprising an L-shaped refrigeration chamber in series air flow communication with said return and delivery ducts, said chamber being formed by substantially right angle plates defining the bottom and lower rear walls of said display area and insulated wall portions spaced outwardly of said plates, air moving means mounted on a partition plate in said chamber, a first evaporator between said air moving means and said return duct, a second evaporator between said air moving means and said delivery duct, said air moving means being angularly positioned in said chamber relative to the air flow path through each of said evaporators, said air moving means drawing air through said first evaporator and moving said air toward an insulated wall portion in a direction that is at an angle of at least 90° to the direction of air flow through said second evaporator, and other air distribution means for forming a wall of air across the open side of said display area.

19. A refrigerated case comprising a display area having an open front, first means for cooling said display area to low refrigeration temperatures and for circulating low refrigeration temperature air therein, and second means forming a first air wall across the open front of said display area, said first means including air discharge means for directing a portion of said low refrigeration temperature air to form a second wall substantially parallel to said first air wall and to support said first air wall in substantially non-turbulent flow, and said first means discharging low temperature air in a direction toward both of said air walls to support them in substantially non-turbulent flow.

20. A refrigerated display case comprising a display area having a vertical front opening, first air cooling and circulating means for producing refrigeration temperatures not substantially higher than 0° F. in the display area, second means for moving a wall of air across the front opening of said display area, and evaporator means in the path of air movement by said second means, said first air cooling means being at least twice as large as said evaporator means whereby all of said air in said wall of air is at refrigerated temperatures substantially higher than the temperature in said display area.

21. A refrigerated display case comprising a display area having a vertical front opening, a primary air cooling and circulation system for distributing refrigerated air at about 0° F. throughout said display area, and a secondary air cooling and circulating system moving a wall of refrigerated air across the front opening of said display case, said primary cooling means being at least twice as large as said secondary air cooling means and the temperature of said air in said wall of air being at about 32° F.

22. A refrigerated display case comprising a display area directly accessible through a vertical front opening defining one side thereof, first means including a low temperature evaporator inducing low refrigeration temperatures in the display area, and second means forming a wall of relatively dry air at high refrigeration temperatures across said front opening and for recirculating said high temperature air in a closed path, said wall of dry air picking up moisture from ambient air and approaching moisture saturation during flow across said front opening and substantially reducing moisture migration into said display area and first means, said second means including a high temperature evaporator in said closed path for condensing moisture to dry said air, said low temperature evaporator being at least twice as large as said high temperature evaporator.

23. A refrigerated case comprising a display area having a vertical front opening, first means for cooling the display area to low refrigeration temperatures, second means forming an air wall across the front opening, said first means discharging air into said display area and, at the point of discharge, in paths toward said air wall to obviate low pressure areas throughout the display area whereby said air wall is maintained in a substantially non-turbulent flow path across said front opening.

24. A refrigerated case comprising a cabinet defining a display area having a vertical front opening, first means for cooling the display area to low refrigeration temperatures and flowing a wall of low temperature air across said front opening, and second means flowing a second wall of refrigerated air across the front opening, said second wall being discharged in a path substantially parallel with said wall of low temperature air, said second means including an evaporator at least half as large as said first means whereby said second air wall is at a higher temperature than said wall of low temperature air.

References Cited in the file of this patent

UNITED STATES PATENTS

| | | |
|---|---|---|
| 2,513,675 | Quillen | July 4, 1950 |
| 2,836,039 | Weber | May 27, 1958 |